(12) United States Patent
Wills

(10) Patent No.: US 7,982,793 B2
(45) Date of Patent: Jul. 19, 2011

(54) DIGITAL PHOTOGRAPHING APPARATUS HAVING A LASER SCANNING PROJECTOR

(75) Inventor: Kevin D. Wills, Kent, WA (US)

(73) Assignee: Microvision, Inc., Redmond, WA (US)

( * ) Notice: Subject to any disclaimer, the term of this patent is extended or adjusted under 35 U.S.C. 154(b) by 500 days.

(21) Appl. No.: 12/123,041

(22) Filed: May 19, 2008

(65) Prior Publication Data

US 2009/0284622 A1 Nov. 19, 2009

(51) Int. Cl.
*H04N 5/222* (2006.01)

(52) U.S. Cl. .................... 348/333.1; 348/333.05

(58) Field of Classification Search ............ 348/207.99, 348/231.99, 333.1, 333.11, 335, 231.9, 211.11, 348/211.12, 211.14; 396/429
See application file for complete search history.

(56) References Cited

U.S. PATENT DOCUMENTS

| | | | | |
|---|---|---|---|---|
| 6,738,075 B1 * | 5/2004 | Torres et al. | | 715/723 |
| 7,116,455 B2 * | 10/2006 | Yamaoka | | 359/204.4 |
| 7,628,327 B2 * | 12/2009 | Winkler et al. | | 235/454 |
| 2005/0253055 A1 | 11/2005 | Sprague et al. | | |
| 2006/0291581 A1 * | 12/2006 | Onggosanusi et al. | | 375/267 |
| 2006/0291851 A1 * | 12/2006 | Nozaki et al. | | 396/429 |
| 2008/0144150 A1 | 6/2008 | Champion et al. | | |

\* cited by examiner

*Primary Examiner* — David Ometz
*Assistant Examiner* — Ahmed Berhan
(74) *Attorney, Agent, or Firm* — Kevin D. Wills

(57) ABSTRACT

In a portable housing, a digital photographing apparatus (100) may include an image capturing unit (100) operable for capturing at least one digital image (172) and a memory (158, 161) for storing the at least one digital image. Digital photographing apparatus may also include a laser scanning projector (150) operable to optically raster scan the at least one digital image on a remote surface (170) one pixel at a time. The laser scanning projector is operable without focusing adjustment to scan the at least one digital image in focus on the remote surface independent of a distance (174) between the digital photographing apparatus and the remote surface. A controller (154) is operable to read the at least one digital image from the memory and operate the laser scanning projector to project the at least one digital image on the remote surface.

22 Claims, 7 Drawing Sheets

DIGITAL PHOTOGRAPHING APPARATUS HAVING A LASER SCANNING PROJECTOR

BACKGROUND OF INVENTION

In the prior art, a digital photograph or video was recorded by a dedicated device, such as a digital camera or digital video camera. The digital images were stored on a memory card, which allowed the digital image to be transferred to a computer or other electronic device. If one wanted to project the digital image (such as a photograph, movie, slide presentation, etc.), onto a screen or wall for an audience, the computer containing the digital image would require connection to a stand-alone projector. The prior art stand-alone projectors are generally large, noisy and consume power such that they must be plugged into an external power source and are not capable of operating via their own internal power source for any reasonable length of time. Further, the prior art stand alone projectors must be manually focused to obtain a sharp image depending on the distance from the projector to the surface where the image is being projected.

Also in the prior art, a camera with an on-board projector includes a projector that uses liquid crystal technology, where the entire image or each frame of successive images are projected all at once. The power consumption of these cameras is such that battery life of the camera is unacceptably low. Further, such prior art cameras suffer from the fact that the projected image must be focused and re-focused depending on the distance from the camera to the surface on which the image is projected. Having to constantly refocus the projected image creates a large inconvenience for a user of such a portable device. Still further, liquid crystal projectors are generally not bright enough to be used in full daylight. Therefore, a user is limited in the usefulness of a portable liquid crystal projector.

There is a need, not met in the prior art, of a portable, hand-held, power-efficient device that both captures digital images and is capable of projecting the in focus digital images on any surface at any distance independent of any focusing requirements.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 2:
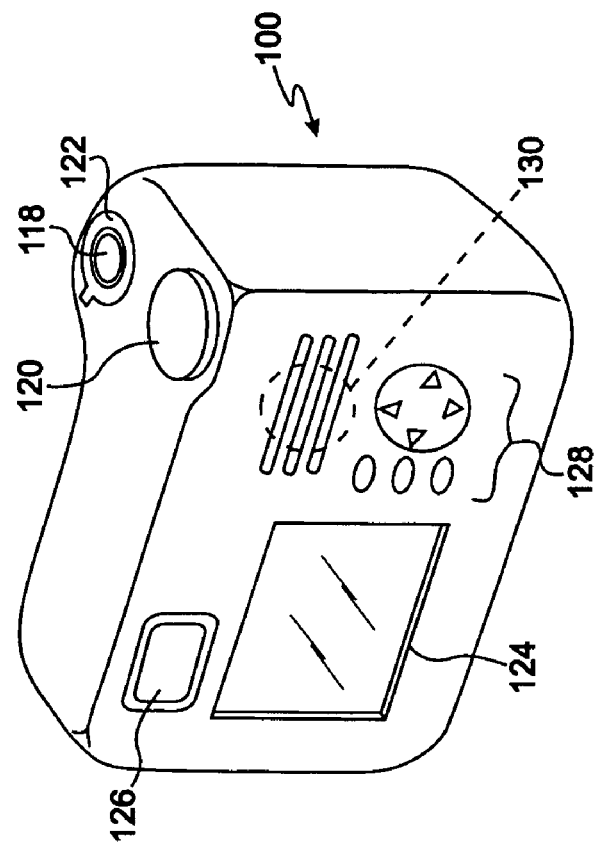
FIG. 2 representatively illustrates another view of the digital photographing apparatus shown in FIG. 1 in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "vertical", "horizontal", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Software blocks that perform embodiments of the present invention can be part of computer program modules comprising computer instructions, such control algorithms, which are stored in a computer-readable medium such as memory. Computer instructions can instruct processors to perform any methods described below. In other embodiments, additional modules could be provided as needed.

Figure 1:
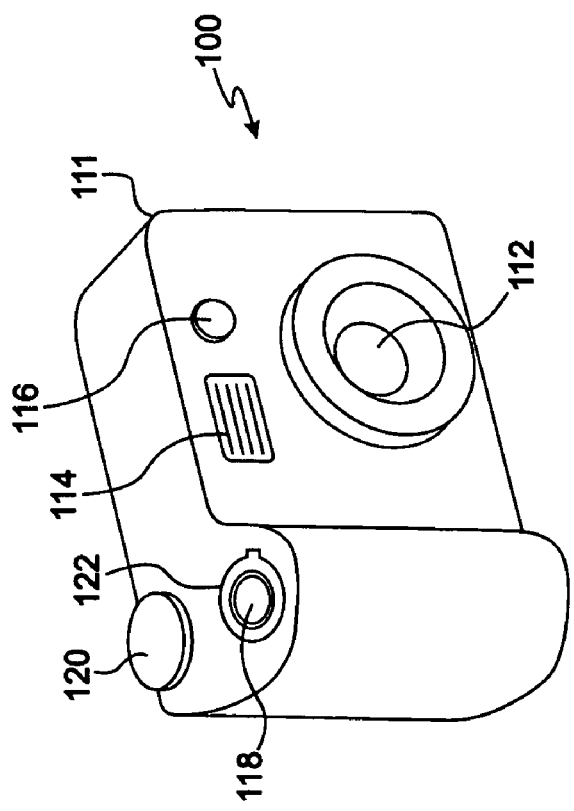
FIG. 1 representatively illustrates a digital photographing apparatus in accordance with an exemplary embodiment of the present invention.

FIG. 1 representatively illustrates a digital photographing apparatus 100 in accordance with an exemplary embodiment of the present invention. Digital photographing apparatus 100 may be a digital camera unit, a digital video camera unit, and the like, contained in a portable housing 111. Digital photographing apparatus 100 may include a photographic lens 112, an illumination means 114 and a laser scanning projection window 116 on one or more surfaces of portable housing 111. Digital photographing apparatus 100 may also include a shutter release button 118, a mode selector switch 120 and a main switch 122 located on one or more surfaces of portable housing 111.

FIG. 2 representatively illustrates another view of the digital photographing apparatus 100 shown in FIG. 1 in accordance with an exemplary embodiment of the present invention. As shown in FIG. 2, digital photographing apparatus 100 may include a built-in screen 124, which can be for example a liquid crystal display unit. Digital photographing apparatus 100 may also include an electronic viewfinder 126, operation members 128 and speaker holes 130 on one or more surfaces of portable housing 111.

Digital photographing apparatus 100 is equipped with a laser scanning projector to be detailed later. The laser scanning projector projects information such as images through the laser scanning projection window 116 toward a remote surface, such as a screen, wall, and the like. In addition, digital photographing apparatus 100 may be equipped with a built-in speaker disposed behind the speaker holes 130 so as to reproduce information such as sound in conjunction with projected images.

The mode selector switch 120 may be operated to switch an operation mode of the digital photographing apparatus 100 to a photographing mode, a projection mode, and the like. In the photographing mode, a subject image is photographed and the at least one digital image is saved onto an internal memory, memory card, and the like, as an image file. If a still image has been photographed, a still image file is generated, whereas if a dynamic image has been photographed, a dynamic image file is generated, such as a video file.

In the photographing operation mode, digital photographing apparatus 100 may be hand held by the photographer. A depression of the shutter release button 118 is equivalent to a photographing start instruction to capture at least one digital image of an object. An illumination means may function to emit light from a light emitting member such as a xenon tube through the illumination means 114. Audio data collected via a built-in microphone disposed together with the speaker behind the speaker holes 130 may be saved into the recording medium in the photographing mode.

In the projection mode, at least one digital image reproduced by using image data that may have been obtained through a previous photographing operation and read out from a recording medium, for example memory, memory card, and the like, is projected by the laser scanning projector through the laser scanning projection window 116. The corresponding audio data may be reproduced via the speaker. It is to be noted that at least one digital image reproduced by using image data read out from a source other than a recording medium or at least one digital image provided from a source outside the digital photographing apparatus 100 can also be projected in the projection mode.

Figure 3:
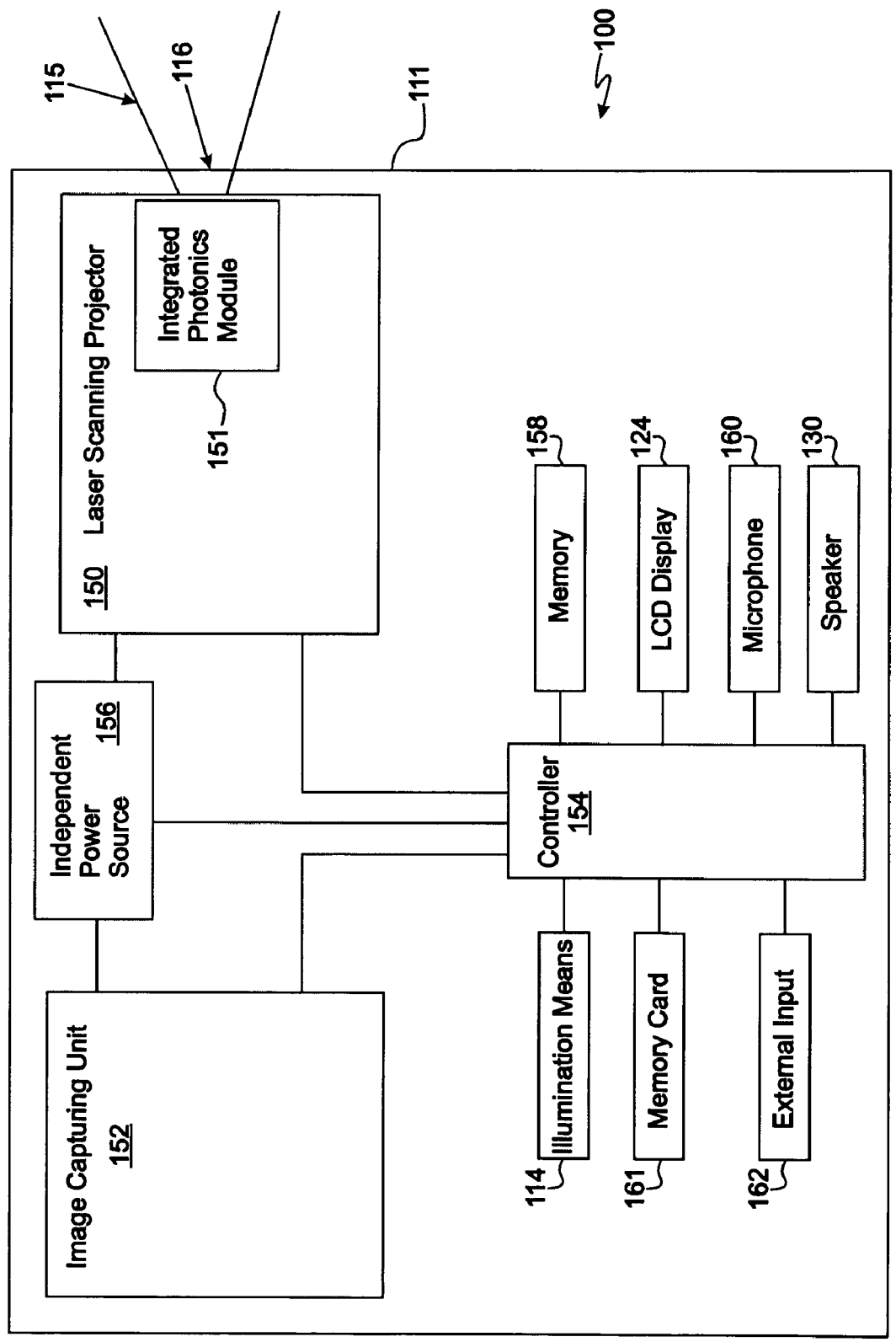
FIG. 3 representatively illustrates a block diagram of a digital photographing apparatus in accordance with an exemplary embodiment of the present invention.

FIG. 3 representatively illustrates a block diagram of a digital photographing apparatus 100 in accordance with an exemplary embodiment of the present invention. Digital photographing apparatus 100 includes a portable housing 111, which contains an image capturing unit 152 and a laser scanning projector 150. Portable housing 111 may be any handheld housing, for example and without limitation, a plastic housing such as a camera housing, phone housing, PDA housing, electronic device housing, and the like. Image capturing unit 152 may be a digital camera capable of capturing at least one digital image. Image capturing unit 152 may also be a digital video camera capable of capturing a successive series of at least one digital image, thereby forming a digital video. Image capturing unit 152 may function as one or both of a digital camera and a digital video camera.

Laser scanning projector 150 is coupled to image capturing unit 152 and operable to optically raster scan at least one digital image on a remote surface one pixel at a time via a light beam 115 through scanning laser scanning projection window 116. In an embodiment, laser scanning projector 150 comprises an integrated photonics module 151 (described in more detail below). Laser scanning projector 150 is operable to project at least one digital image in focus without focusing adjustment independent of the distance between the remote surface and digital photographing apparatus 100. Laser scanning projector 150 optically raster scans an image that has substantially infinite focus such that any image projected is in focus regardless of the distance from the laser scanning projector 150. Therefore, laser scanning projector 150 does not require any focusing adjustment means (automatic or manual) to focus at least one digital image on a remote surface. At least one digital image is inherently focused when projected on a remote surface independent of the distance between the projection source and the remote surface.

In an embodiment, image capturing unit 152 and laser scanning projector 150 may be coupled to controller 154 and independent power source 156. Controller 154 is operable to read at least one digital image from a memory location and operate the laser scanning projector to project the at least one digital image on a remote surface. In an embodiment, controller 154 may also control operation of the image capturing unit 152 based upon a control program. Controller 154 can include a central processing unit (CPU), dedicated or non-dedicated memory, and the like, operable to execute a control program stored in a memory to operate at least one of the image capturing unit 152 and the laser scanning projector 150.

Independent power source 156 is operable to power the image capturing unit 152 and the laser scanning projector 150 independent of an external power source. Independent power source 156 may be an on-board battery, for example and without limitation, a lithium ion battery, and the like. Independent power source 156 may include replaceable batteries, rechargeable batteries (including replaceable and non-replaceable), and the like. External power sources can include a battery external to portable housing 111, power from an electrical outlet, power grid, generator or any other power sources that is not self-contained in portable housing. Independent power source 156 may operate for at least a limited time independent of any power sources external to portable housing.

In an embodiment, controller 154 may be coupled to memory 158, a liquid crystal display (LCD) 124, microphone 160, speaker 130, illumination means 114, memory card 161 via a memory card interface, and an external input/output interface 162. Memory 158 may include volatile or non-volatile memory, for example and without limitation flash memory, and the like. Memory card 161 may include any type of memory card, for example and without limitation, SDRAM, CompactFlash, Smart Media, USB flash drive, and the like, accessed through a memory card interface such as a memory card slot, USB port, and the like. Memory card 161 is operable to provide additional memory for digital photographing apparatus 100 to store at least one digital image. Memory card 161 can also provide a mechanism by which at least one digital image stored on memory card 161 is portable and can be easily transferred from digital photographing apparatus 100 to another electronic device, for example a computer, and the like. At least one digital image obtained by image capturing unit 152 through a photographing or video operation may be stored in memory 158 and/or memory card 161 such that image data can be read out of memory 158 or memory card 161 in response to a command issued by controller 154.

In an embodiment, microphone 160 can be used to record sound in tandem with at least one digital image. Further, speaker (or speakers) 130 can be used to play back sound in tandem with projection of at least one digital image by laser scanning projector 150.

Illumination means 114 may engage a light emission device in response to a light emission instruction output by controller 154 and is operable to radiate illuminating light to be used to illuminate the subject being photographed. In an embodiment, illumination means 114 can operate as a "flash" to illuminate a subject momentarily for a digital photograph. In another embodiment, illumination means 114 can operate continuously to illuminate a subject during the recording of a digital video.

Liquid crystal display 124 is operable to display information such as at least one digital image, text, and the like, in response to commands issued by controller 154. Text information displayed in the LCD 124 may indicate the operational state of digital photographing apparatus 100, display menus, or the at least one digital image.

In order to enable digital photographing apparatus 100 to project digital images and videos from a source other than image capturing unit 152, external input/output interface 162 enables audio signals, video signals and data image files to be loaded into memory 158 or streamed into digital photographing apparatus 100 for projection by laser scanning projector 150.

Figure 4:
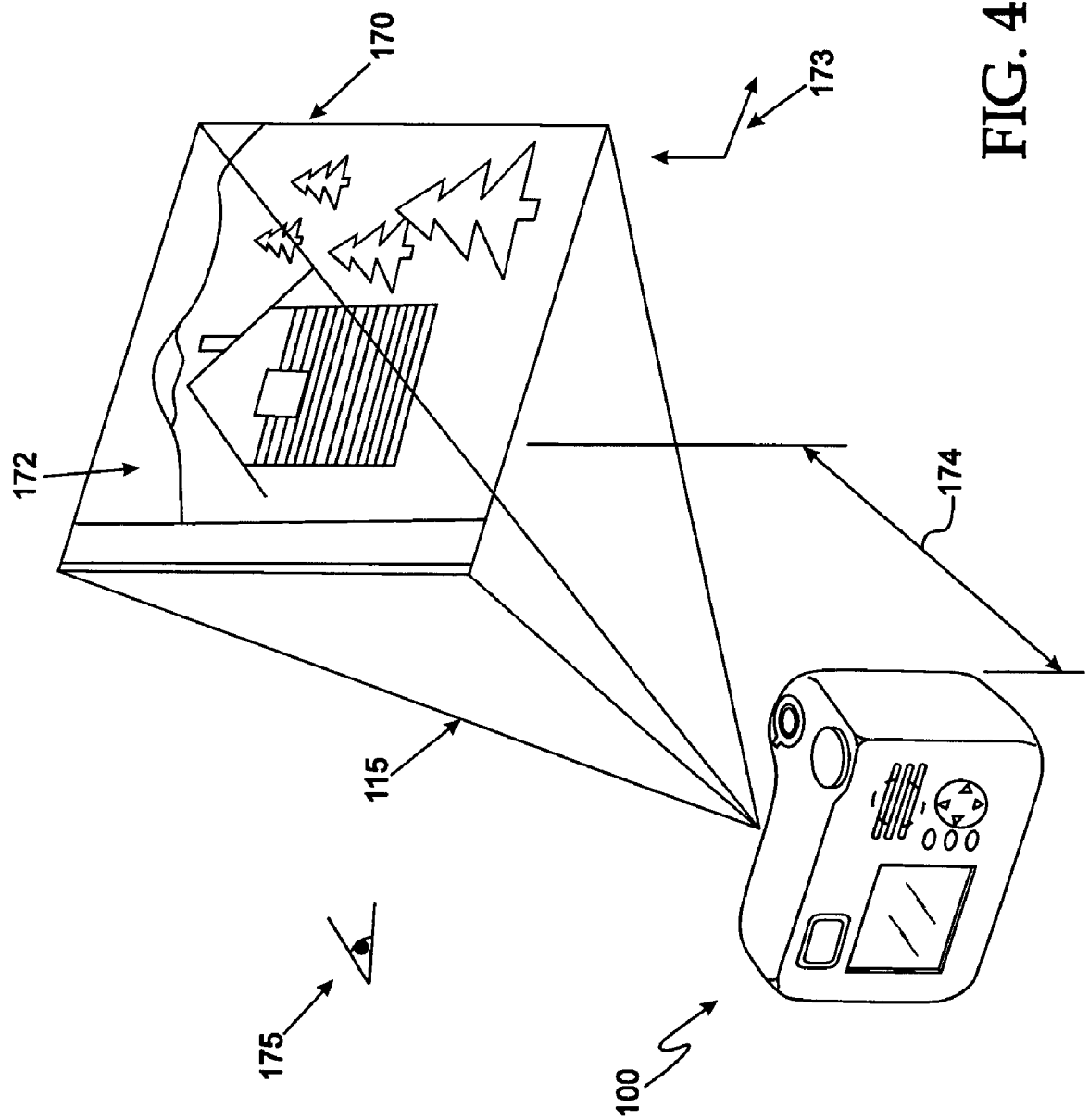
FIG. 4 representatively illustrates digital photographing apparatus raster scanning at least one digital image on a remote surface in accordance with an exemplary embodiment of the present invention.

FIG. 4 representatively illustrates digital photographing apparatus 100 raster scanning at least one digital image 172 on a remote surface 170 in accordance with an exemplary embodiment of the present invention. In an embodiment, image capturing unit 152, which may be a digital camera, digital video camera or other photographic device, is operable capture at least one digital image 172, which may be a still digital photograph, digital video, and the like. At least one digital image 172 may be stored in memory 158 or a memory card 161. Controller 154 may read the at least one digital image 172 from memory 158 or memory card 161 and operate laser scanning projector 150 to project the at least one digital image on remote surface 170, which is a distance 174 away from digital photographing apparatus 100. In an embodiment, remote surface 170 is a surface that is not part of and not physically or electrically or wirelessly coupled to digital photographing apparatus 100.

In an embodiment, at least one digital image 172 is optically raster scanned in two dimensions 173 one pixel at a time. In other words, laser scanning projector 150 in digital photographing apparatus 100 is operable to sweep light beam 115 in two dimensions such that one pixel at a time is "painted" on remote surface 170. Further, laser scanning projector 150 may operate without any focusing adjustment such that at least one digital image 172 is always in focus on remote surface 170 independent of the distance 174 between digital photographing apparatus 100 and remote surface 170. In other words, at least one digital image remains in focus even if digital photographing apparatus 100 is moved to vary the distance from remote surface 170. The at least one image remains in focus without any adjustment or focusing by digital photographing apparatus 100 or a user. This differs from prior art projectors (i.e. liquid crystal display (LCD), liquid crystal on silicon (LCOS), laser scanning digital light processing (DLP), and the like) where an entire image or an entire frame of an image is projected all at once and the projected image must be focused depending on the distance from the projector. Further, laser scanning projector 150 provides a projected image that is viewable in full daylight (due to the inherent brightness and collimated light of a laser), whereas liquid crystal technology will not provide a bright enough image for full daylight viewing. In this embodiment, digital photographing apparatus 100 and laser scanning projector 150 overcome these disadvantages of prior art projectors.

At least one digital image 172 may be scanned at a refresh rate such that the pixels persist to enable steady viewing of the at least one digital image 172 by a viewer 175 independent of any photoluminescent material, such as phosphors, and the like used in conventional CRT and rear-laser projection television screens. This overcomes the disadvantage of the prior art in that no dedicated fixed screen or screen material is required to project an image, which makes digital photographing apparatus 100 compact, versatile, portable and able to be used anywhere unlike prior art projectors.

Figure 5:
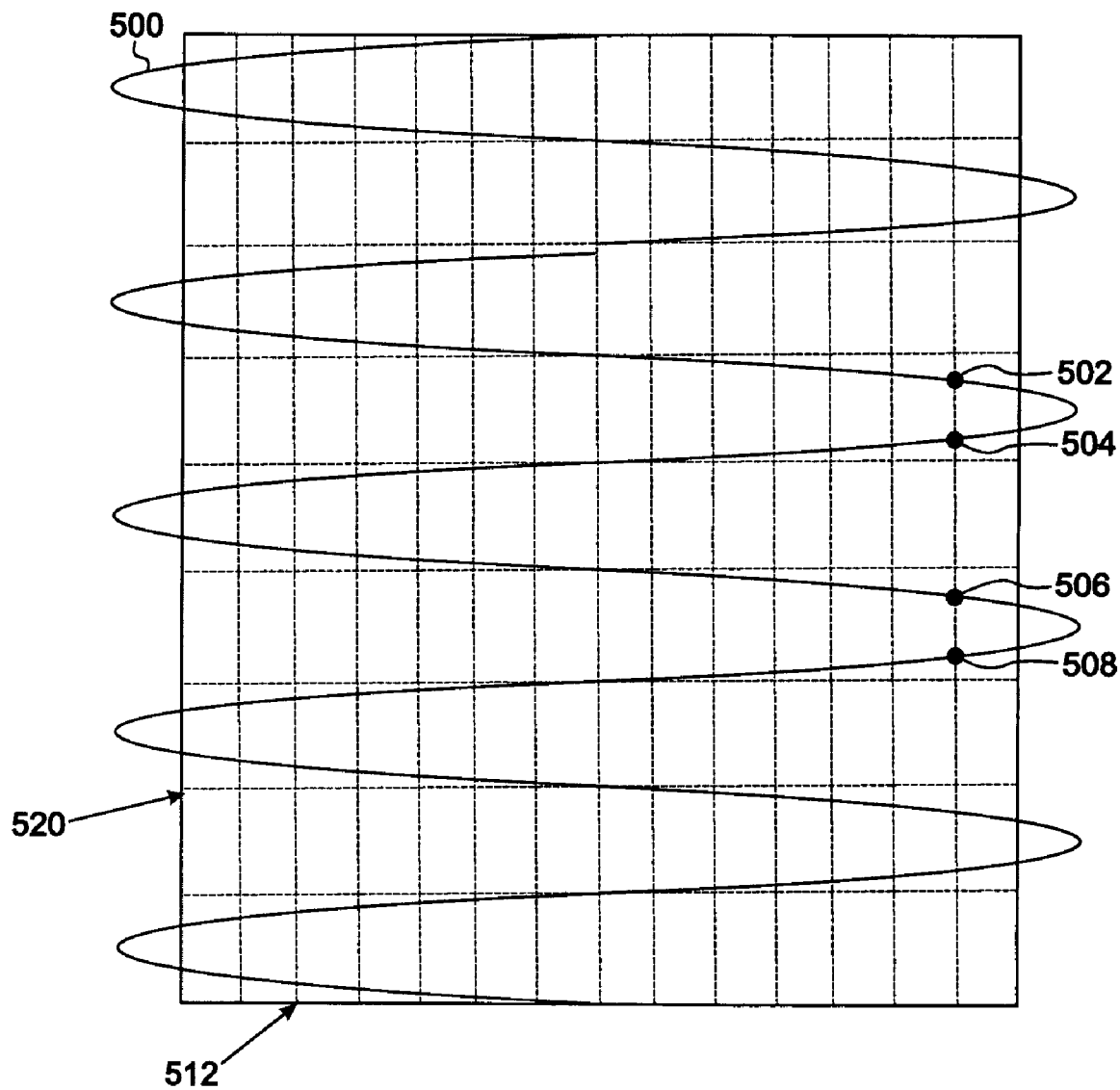
FIG. 5 representatively illustrates a raster scan in accordance with an exemplary embodiment of the present invention.

FIG. 5 representatively illustrates a raster scan in accordance with an exemplary embodiment of the present invention. FIG. 5 shows a traditional raster scan trajectory having a sinusoidal component on the fast-scan axis 512 (horizontal axis) and a sawtooth component on the slow-scan axis 510 (vertical axis). Scan trajectory 500 is shown superimposed upon a grid, which may represent rows and columns of pixels that make up a display image. The rows of pixels are aligned with the horizontal dashed lines, and columns of pixels are aligned with the vertical dashed lines. The image is made up of pixels 502-508 that occur substantially at the intersections of dashed lines. On scan trajectory 500, the beam sweeps back and forth left-to-right in a sinusoidal pattern, and sweeps vertically (top-to-bottom) in a sawtooth pattern with the display blanked during flyback (bottom-to-top).

The vertical sweep rate is typically set such that the number of horizontal sweeps equals the number of rows in the grid, and the vertical scan position at any time is approximated as a corresponding row. For example, as shown in FIG. 5, each horizontal sweep from left-to-right corresponds to one row and the following sweep from right-to-left may correspond to the next row.

The embodiment of FIG. 5 is not limited to sinusoidal scanning in only one dimension. For example, sinusoidal scanning (bi-sine) in both horizontal and vertical dimensions is within the scope of the invention. The embodiment of FIG. 5 is not limited equal numbers of rows or columns and the sinusoidal scan can be in the vertical as opposed to the horizontal direction or in both directions and be within the scope of the invention.

Figure 6:
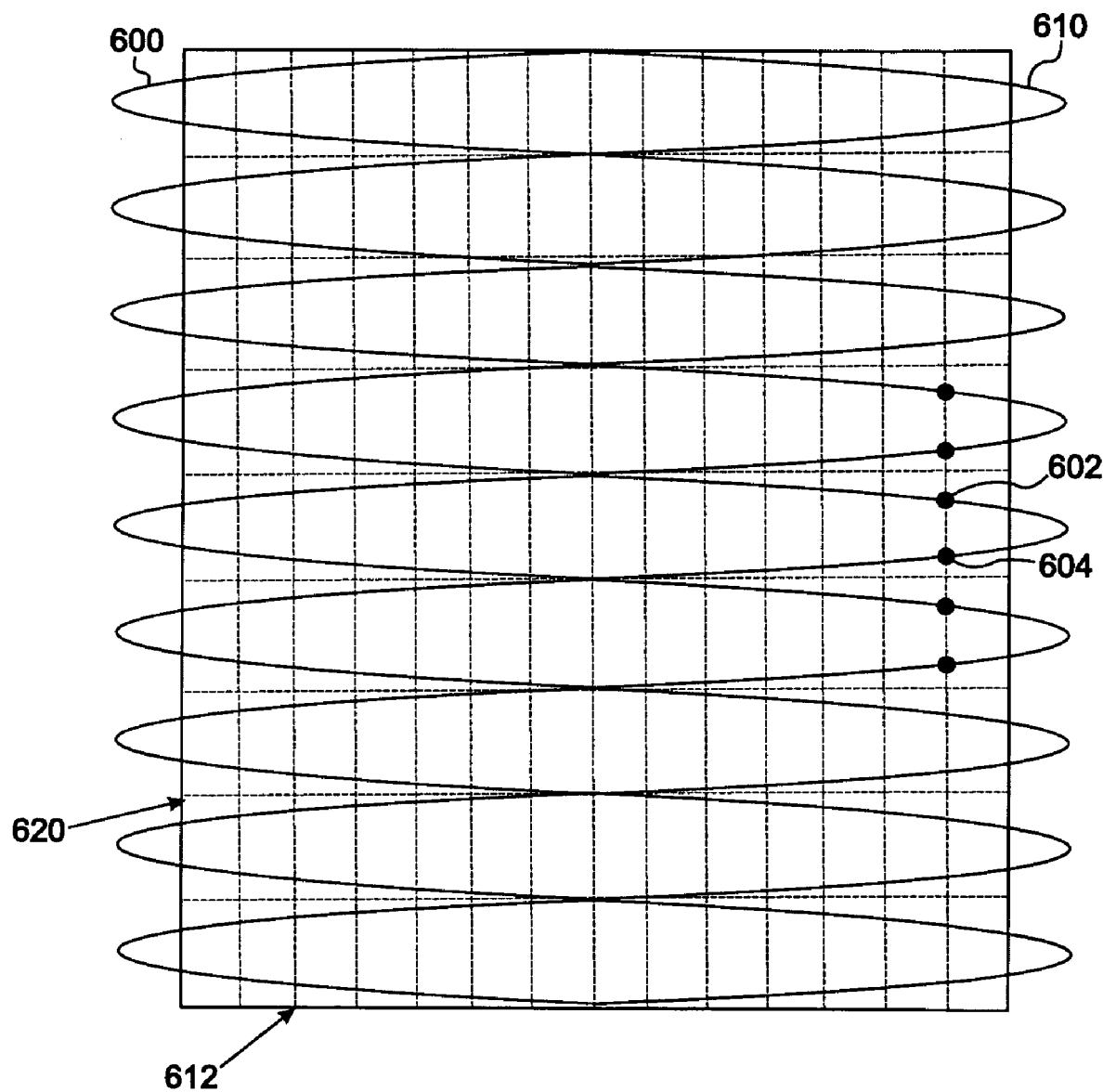
FIG. 6 representatively illustrates a raster scan in accordance with another exemplary embodiment of the present invention.

FIG. 6 representatively illustrates a raster scan in accordance with another exemplary embodiment of the present invention. FIG. 6 shows a multi-phased raster scan trajectory 600, 610 traversing an image field of view. The scan trajectory of FIG. 6 is shown superimposed on grid having a horizontal axis 612 and a vertical axis 620 (described above with reference to FIG. 5). The area within grid represents an image field of view, and the intersections of dashed lines substantially represent pixel locations within the image. The image is made up of pixels 602, 604 that occur at the intersections of dashed lines. The horizontal deflection is sinusoidal, and the vertical deflection is linear (although the converse is within the scope of the invention). The scanned beam traverses the image field of view at least twice before repeating, where successive traversals have a phase offset. For example, the beam traverses the image field of view at 600 and then again at 610 with a phase offset of 180 degrees before repeating. The term "trajectory" is used herein to describe any portion of the entire scanning pattern that traverses the image field of view. For example, trajectory 600 traverses the field of view, as does trajectory 610. Trajectory 600 and trajectory 610 may be successive.

FIG. 6 shows two trajectories having a phase offset of 180 degrees. Any number of trajectories may exist where each successive trajectory has a phase offset relative to the previous trajectory. For example, in some embodiments, three trajectories with phase offsets of 120 degrees may be used. Also for example, in some embodiments, four trajectories with phase offsets of 90 degrees may be used.

Multi-phased scanning trajectories in accordance with various embodiments of the present invention may be produced in many ways. For example, in some embodiments, trajectory 600 is scanned from top-to-bottom, then the beam flies back to the top, and then trajectory 610 is scanned from top-to-bottom. In other embodiments, trajectory 600 is scanned from top-to-bottom, and then trajectory 610 is scanned from bottom-to-top.

By including multiple trajectories with phase offsets, the visual effects of raster pinch associated with the traditional raster scan of FIG. 5 can be mitigated because blank areas within the image field of view can be "filled in". In some embodiments, each horizontal sweep corresponds to a row of pixels. In these embodiments, each trajectory paints all of the pixels.

In some embodiments, displayed pixel data is interpolated. For example, pixels 602 and 604 may display data interpolated from actual pixel data in the rows above and below. Interpolation may be performed vertically, horizontally, or both.

Figure 7:
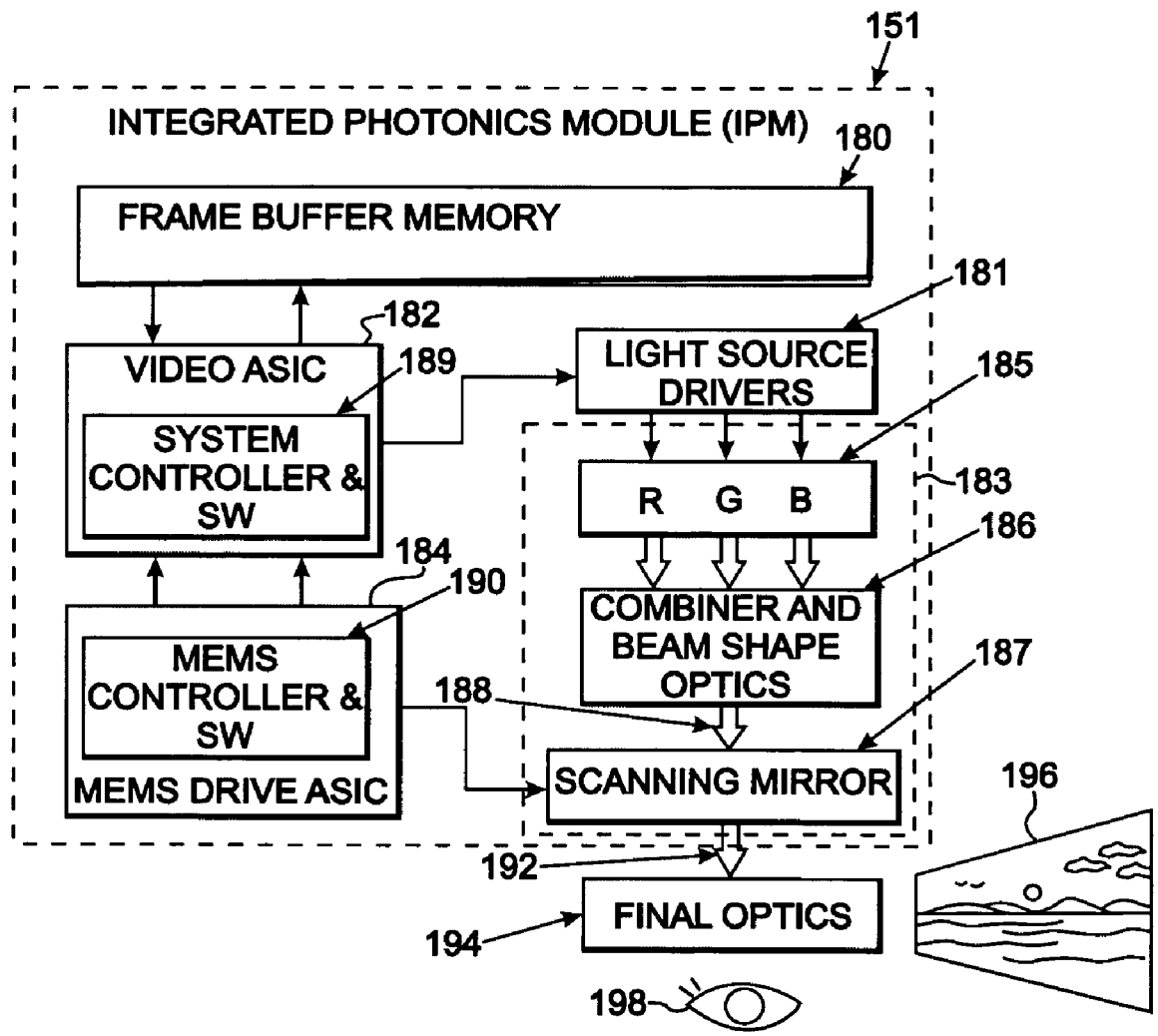
FIG. 7 representatively illustrates an integrated photonics module in accordance with an exemplary embodiment of the present invention.

FIG. 7 representatively illustrates an integrated photonics module 151 in accordance with an exemplary embodiment of the present invention. Integrated photonics module 151 may be used for displaying images such as video images according to an embodiment. Video controller electronics 182, which may be embodied as an integrated video application-specific integrated circuit (ASIC) including a system controller and software 189, receives an input video signal. The video controller electronics 182 may at least temporarily buffer received video images in video memory 180, which may include frame buffer memory. When it is time to display a new video frame, the video controller electronics 182 reads the cached video frame from the video memory 180 and sequentially drives one or more light source drivers 181 to a sequence of brightness values corresponding to pixel values in the input video signal. The light source drivers 181 drive one or more light sources 185, for example at least one laser source, which may be included in an integrated optical engine portion 183 of the integrated photonics module 151, according to an embodiment.

The light sources 185 create one or more modulated beams of light that may be shaped and combined by the combiner and beam shaping optics 186 into a modulated composite beam of light 188. The light sources 185 may, for example, comprise red, green, and blue modulated lasers. According to some embodiments, the modulated composite beam of light 188 may be directed toward a scanning mirror 187, which may for example be a MEMS scanner, operable to scan the modulated composite beam over a field of view (FOV) to create an image.

While the video controller electronics 182 drives the light source drivers 181, it simultaneously drives a scanner controller 184, which may optionally be embodied as a scanner drive ASIC that may, according to some embodiments, also contain a scanner controller and software 190. The scanner controller 184 is operable to drive the scanning mirror 187 to sequentially scan the emitted light across the FOV as a modulated scanned beam of light 192 in a periodic scan pattern one pixel at a time.

The scanning mirror 187 deflects the modulated beam of light across the FOV to produce a scanned beam of light 192. The scanned beam of light 192 may optionally be conditioned and/or relayed by final optics 194 to produce an image 196. In an embodiment, image 196 may be at least one digital image, which may be a digital photograph or a digital video.

Instantaneous positions of the scanned beam of light 192 sequentially illuminate pixels in the FOV, the FOV comprising a remote surface 170, and the like. To display at least one image, substantially all the pixels in the FOV are sequentially illuminated, nominally with an amount of power proportional to the brightness of an input video image pixel corresponding to each pixel.

While the beam illuminates the pixels, a portion of the illuminating light beam is reflected or scattered as scattered energy. A portion of the scattered light energy may travel to one or more viewers 198. Persistence of vision in the viewer's eye and mind integrates the sequence of illuminated spots in the FOV into a recognizable image 196 or series of images that may comprise static and/or moving images.

The light sources 185 may include multiple emitters such as, for instance, light emitting diodes (LEDs), lasers, thermal sources, arc sources, fluorescent sources, gas discharge sources, or other types of emitters. According to one embodiment, a light source 185 comprises a red laser diode having a wavelength of approximately 635 to 670 nanometers (nm). According to another embodiment, the light sources 185 comprises three lasers including a red diode laser operable to emit a beam at approximately 635 nm; a green diode-pumped solid state (DPSS) laser such as frequency-doubling or second harmonic generation (SHG) laser excited by an infrared laser diode at about 1064 nm wavelength, the green SHG laser being operable to emit a green beam of light at about 532 nm; and a blue laser diode operable to emit light at about 473 nm. While some lasers may be directly modulated, other lasers may require external modulation such as an acousto-optic modulator (AOM) for instance. In the case where an external modulator is used, it is considered part of the light source 185.

The beam combining and shaping optics 186 are aligned to receive the beams of light emitted by the light sources 185 and to combine some or all of the beams into a composite beam of light 188. The beam combining and shaping optics 186 may also include beam-shaping optics such as one or more circularizing lenses, collimating lenses, focusing lenses, relay lenses, and/or apertures and wavelength selecting optics such as birefringent filters, gel filter, hot mirrors, etc. Additionally, while the wavelengths described have been in the optically visible range, other wavelengths may be within the scope of the invention.

According to various embodiments, the scanning mirror 187 may be formed using many known technologies such as, for instance, a rotating mirrored polygon, a mirror on a voice-coil, a mirror affixed to a high speed motor, a mirror on a bimorph beam, an in-line or "axial" gyrating scan element, a MEMS scanner, or other type. A MEMS scanner may be of a type described in U.S. patent application Ser. No. 10/984,327, entitled MEMS DEVICE HAVING SIMPLIFIED DRIVE, for example, incorporated herein by reference.

In the case of 1D scanners, the scanner may include a first beam director driven to scan the output beam along a single axis and a second beam director driven to scan the output beam in a second axis. In such a system, both scanners are referred to as a scanning mirror 187. In the case of a 2D scanner, scanning mirror 187 is driven to scanned beam of light 192 along a plurality of axes (optionally through final optics 194) to sequentially illuminate pixels in the field of view to produce the image 196.

For compact and/or portable display systems, a MEMS scanner is often preferred, owing to the high frequency, durability, repeatability, and/or energy efficiency of such devices. A bulk micro-machined or surface micro-machined silicon MEMS scanner may be preferred for some applications depending upon the particular performance, environment or configuration.

A biaxial scanning mirror, which is a two-dimensional MEMS scanner embodiment of the scanning mirror 187, scans one or more composite beams of light 188 at high speed in a pattern that covers an entire projection screen or a selected region of a projection screen within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

In one embodiment, scanning mirror 187 may be driven directly through a magnetic, electrostatic or other drive (as noted above). In another embodiment, scanning mirror 187 may be at least one inertial-driven scanning mirror. In this embodiment, one or more scanning mirrors 187 may be driven indirectly through inertia, by for example and without limitation, an outer frame or plate coupled to the scanning mirror. The outer frame or plate may totally or partially surround the scanning mirror 187 and be directly driven magnetically, electrostatically, and the like. The driving of the outer frame or plate thereby moves and controls the at least one scanning mirror indirectly through inertia. The at least one inertial-driven scanning mirror is then operable to sweep at least one light beam in two dimensions to optically raster scan the at least one digital image on a remote surface one pixel at a time.

Figure 8:
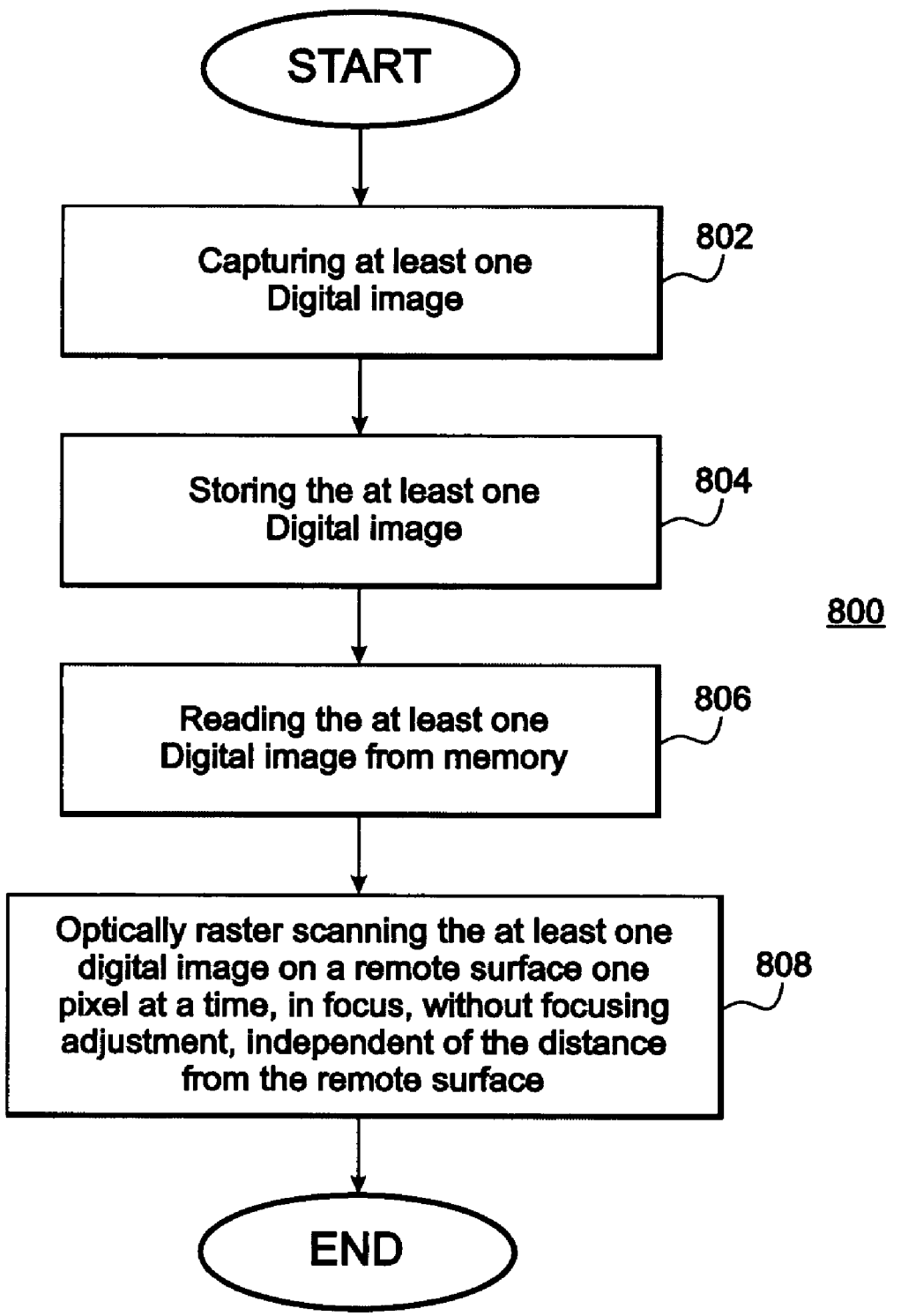
FIG. 8 representatively illustrates a flow chart in accordance with an exemplary embodiment of the present invention.

FIG. 8 representatively illustrates a flow chart 800 in accordance with an exemplary embodiment of the present invention. In an embodiment, the method of flow chart 800 takes place within portable housing 111. In step 802, a photographic device contained in the portable housing captures at least one digital image. The at least one digital image is stored in memory in step 804. In step 806, the at least one digital image is read from memory by a controller, processor, and the like. In step 808, a laser scanning projector contained in the portable housing optically raster scans the at least one digital image on a remote surface one pixel at a time. Without focusing adjustment the laser scanning projector scans the at least one digital image in focus on the remote surface independent of a distance between the device and the remote surface.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

I claim:

1. A device, comprising:
   a portable housing;
   an image capturing unit contained in the portable housing operable for capturing at least one digital image;
   memory for storing the at least one digital image;
   a laser scanning projector contained in the portable housing and coupled to the image capturing unit, wherein the laser scanning projector includes a scanning mirror to optically raster scan the at least one digital image on a remote surface one pixel at a time, and wherein the laser scanning projector is operable without focusing adjustment to scan the at least one digital image in focus on the remote surface independent of a distance between the device and the remote surface; and
   a controller operatively coupled to the scanning mirror to scan the at least one digital image on a trajectory across a field of view on the remote surface, wherein the trajectory traverses the field of view multiple times with a phase offset before repeating.

2. The device of claim 1, wherein the imaging capture unit is one of a digital camera and a digital video camera.

3. The device of claim 1, wherein the at least one digital image is one of a digital photograph and a digital video.

4. The device of claim 1, wherein the laser scanning projector further comprises:

at least one laser source operable to emit a light beam, wherein the light beam is deflected by the scanning mirror to optically raster scan the at least one digital image on the remote surface one pixel at a time.

5. The device of claim 1, further comprising an independent power source operable to power the image capturing unit and the laser scanning projector independent of an external power source.

6. The device of claim 1, wherein the at least one digital image is raster scanned at a refresh rate such that the pixels persist to enable steady viewing of the at least one digital image independent of a photoluminescent material.

7. The device of claim 1 wherein the phase offset is 180 degrees.

8. The device of claim 1 wherein the phase offset is 120 degrees.

9. The device of claim 1 wherein the phase offset is 90 degrees.

10. A digital photographing apparatus, comprising:
a portable housing;
a photographic device contained in the portable housing operable for capturing at least one digital image;
memory contained in the portable housing for storing the at least one digital image;
a laser scanning projector contained in the portable housing and coupled to the photographic device, wherein the laser scanning projector is operable to optically raster scan the at least one digital image on a remote surface one pixel at a time, wherein the laser scanning projector is operable without focusing adjustment to scan the at least one digital image in focus on the remote surface independent of a distance between the device and the remote surface, and wherein the at least one digital image is raster scanned at a refresh rate such that the pixels persist to enable steady viewing of the at least one digital image; and
a controller operable to read the at least one digital image from the memory and operate the laser scanning projector to scan the at least one digital image on the remote surface, wherein the raster scan follows a trajectory that scans the digital image on the remote surface multiple times with a phase offset before repeating.

11. The digital photographing apparatus of claim 10, wherein the photographic device is one of a digital camera and a digital video camera.

12. The digital photographing apparatus of claim 10, wherein the at least one digital image is one of a digital photograph and a digital video.

13. The digital photographing apparatus of claim 10, wherein the laser scanning projector further comprises:
a biaxial scanning mirror; and
at least one laser source operable to emit a light beam, wherein the light beam is deflected by the biaxial scanning mirror to optically raster scan the at least one digital image on the remote surface one pixel at a time.

14. The digital photographing apparatus of claim 10, further comprising an independent power source operable to power the photographic device and the laser scanning projector independent of an external power source.

15. The digital photographing apparatus of claim 10, wherein the laser scanning projector comprises at least one inertial-driven scanning mirror operable to sweep at least one light beam in two dimensions to optically raster scan the at least one digital image on the remote surface one pixel at a time.

16. The digital photographing apparatus of claim 10, wherein the pixels persisting to enable steady viewing of the at least one digital image is independent of a photoluminescent material.

17. In a portable housing, a method, comprising:
a photographic device contained in the portable housing capturing at least one digital image;
storing the at least one digital image in memory;
a controller reading the at least one digital image from the memory; and
a laser scanning projector contained in the portable housing optically raster scanning the at least one digital image on a trajectory through a field of view on a remote surface one pixel at a time, wherein the trajectory traverses the field of view multiple times with a phase offset before repeating, and wherein without focusing adjustment the laser scanning projector scans the at least one digital image in focus on the remote surface independent of a distance between the device and the remote surface.

18. The method of claim 17, further comprising an independent power source powering the photographic device and the laser scanning projector independent of an external power source.

19. The method of claim 17, further comprising:
the laser scanning projector including a biaxial scanning mirror and at least one laser source operable to emit a light beam; and
the biaxial scanning mirror deflecting the light beam to optically raster scan the at least one digital image on the remote surface one pixel at a time.

20. The method of claim 17, the laser scanning projector comprising at least one inertial-driven scanning mirror sweeping at least one light beam in two dimensions to optically raster scan the at least one digital image on the remote surface one pixel at a time.

21. The method of claim 17, wherein the photographic device is one of a digital camera and a digital video camera.

22. The method of claim 17, wherein the at least one digital image is one of a digital photograph and a digital video.

* * * * *